United States Patent Office 3,304,869
Patented Feb. 21, 1967

3,304,869
PHOTOELECTRIC DUAL PUMP CONTROL PROVIDING A CONSTANT COMBINED OUTPUT
Horst K. Blume, Philadelphia, Pa., assignor to Phoenix Precision Instrument Co., Philadelphia, Pa., a corporation of Pennsylvania
Filed Oct. 29, 1963, Ser. No. 319,884
2 Claims. (Cl. 103—11)

This invention relates to a gradient producing method and device as commonly employed in column chromatography for the elution and separation of compounds from chromatographic columns or the like and more specifically to a universal gradient producing device which will re-produce any desired graphic function of pH or ionic strength or both.

A purpose is to produce a curve follower which acts on a curve capable of being cut out from a piece of chart paper, plastic or the like.

A further purpose is to achieve a gradient wherein the complexity is only limited by the art of cutting such a curve and the resolution of the detecting system.

A further purpose is to drive the detector head following the borderline of the cut curve by a servo-motor of the servo-amplifier system as a function of the error signal received from the photocell bridge circuit.

A further purpose is to drive stroke adjusting screws of a dual-pump arrangement by the servo-motor.

A further purpose is to use the position of the detector head which follows the curve to determine the relationship of the stroke adjustment of the pumps which in turn produces the gradient as a function of combined volume delivery.

A further purpose is to vary the composition of a mixture between two components without changing the total volume being delivered.

A further purpose is to use the drum rotated position to select solutions to produce a complex gradient.

A further purpose is to produce a gradient of almost indefinite length, the only limitation of which is the practical length of the curve.

A further purpose is to employ a drive motor for the drum having variable drive speeds to obtain a large selection of running times.

A further purpose is to obtain slow changing gradients as well as discrete changes in both directions so that the gradient can be altered at any desired time to meet most complex gradient requirements.

A further purpose is to use a cut gradient curve over and over without complicated refilling of chambers or other separate reservoirs and/or mixing devices.

A further purpose is to utilize a variable gradient pump which not only produces a gradient but which also delivers the gradient against pressures as high as 500 pounds per square inch or more.

A further purpose is to provide a variable gradient pump directly applicable for chromatographic or other column work.

A further purpose is to incorporate a valving system in the elutrient to allow change-over to other elutrient materials during operation at any preselected time.

A further purpose is to permit fine changes of pH or concentration like cutting from or adding to the curve to meet specific requirements at certain sections of operation.

A further purpose is to provide appropriate pump construction of material which allows the utilization of all kinds or organic and inorganic materials.

A further purpose is to provide a gradient producing pump comprising a photoelectric curve follower and a dual-pump system, both of which are interconnected by means of a servo-system drive mechanism to make up a gradient producing device of universal latitude.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

FIGURE 3 is a fragmentary schematic view of a modified detector head.

Figure 1:
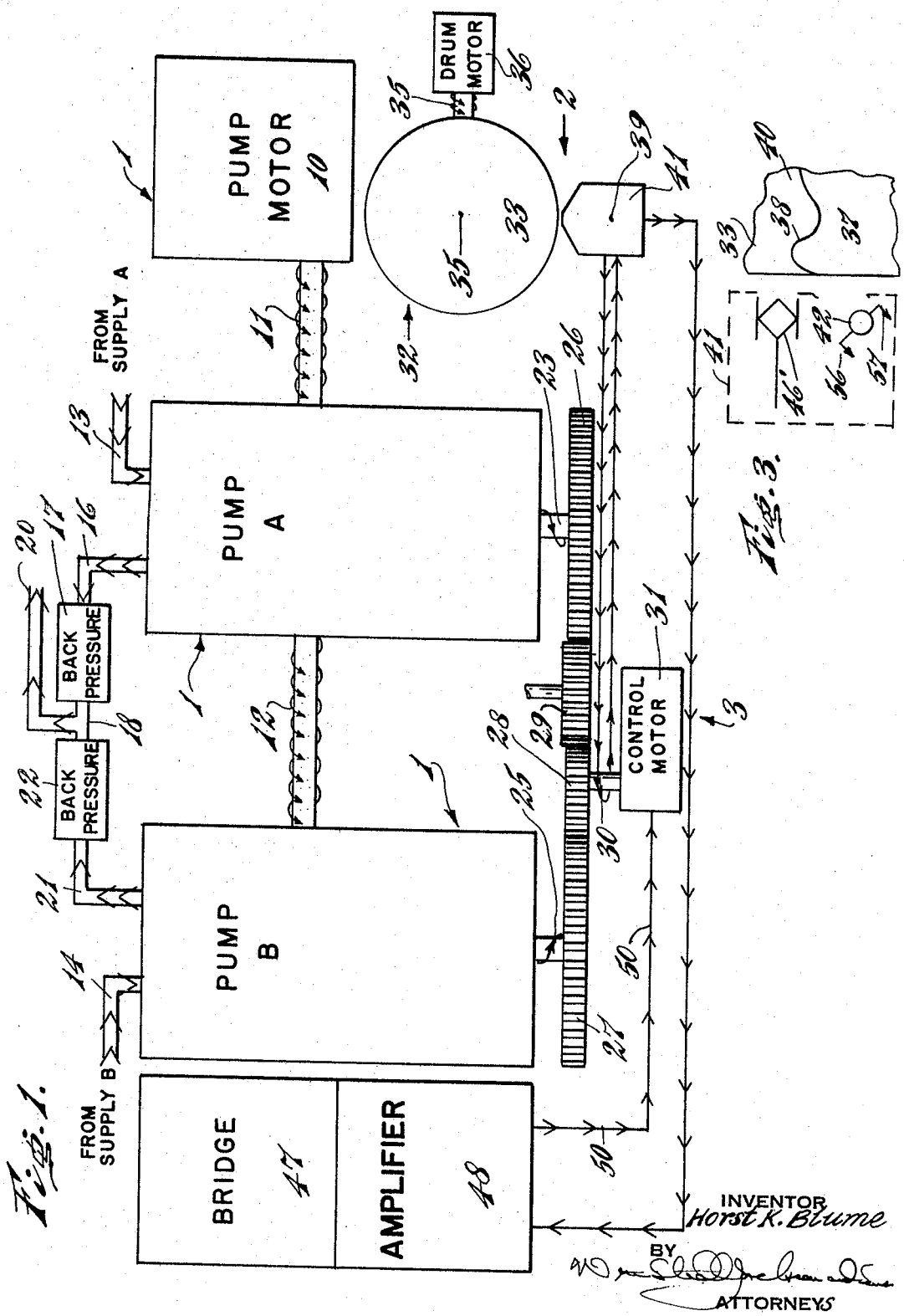
FIGURE 1 is a schematic layout of the system of the invention including the dual-pumps, the piping arrangements, and a schematic showing of the drum and detector head in plan view.

Describing in illustration but not in limitation and referring to the drawings:

In the prior art, it has been found in many chromatographic applications that the elution of compounds from chromatographic columns by means of various elutrient materials is unsatisfactory in respect to the separation of these compounds. The utilization of a single elutrient has in many cases proven unsatisfactory and a discrete change of elutrient materials during the elution time had to be made to obtain good separation of compounds. In some cases, two or more separate columns had to be used for proper separation of complex mixtures, each of which may be using different elutrients. However, in many cases it is desirable to separate all compounds on a single column to save analysis time and sample material. This, however, in most cases can only be done by utilization of an elutrient with continuous changing of pH or ionic strength or both, a so-called variable gradient.

Many such methods for producing variable gradients had been devised by investigators, the most simple of which is in the in-series connection of liquid reservoirs by means of a syphoning tube and the removal of liquid from one of the reservoirs. This system, however, is limited in its usefulness as only simple gradient functions can be produced in such a manner. A more sophisticated device finally led to the development of the so-called Varigrad as described in Peterson, E. A., and Sober, H. A., Anal. Chem. 31, 857 (1959). This device made it possible to produce more complex gradients and was of considerable advantage in the chromatographic field. However, the shortcomings of this device are the difficulties of producing discrete pH or ionic strength changes during a run, the limtations in making very fine corrections to alter the gradient every slightly at certain points, and the required refilling of the device for repeat performances. The mechanical design also makes it impractical to enlarge the Varigrad indefinitely and therefore limits its capacity.

My invention is intended to be useful in producing desired gradients of utmost complexity by means of a dual-pump arrangement. The advantage of this device is that all kinds of gradients can be produced without encountering the deficiencies of the devices described before. The utilization of a photoelectric detection system as a curve follower allows most complex curves to be followed, the only limitation being the difficulty in mechanically producing a suitable curve. Therefore, the complexity of a gradient is only limited by the art of cutting such a curve and the resolution of the detecting system.

The detector head following the borderline of the cut curve is driven by the servo-motor of the servo-amplifier system as a function of the error signal received from the photocell bridge circuit. The same servo-motor also drives the stroke adjustment screws of the dual-pump arrangement accordingly. Thus, the position of the detector head, which follows the curve, determines the position of the stroke adjustment of the pumps which in turn produces the gradient as a function of the combined volume delivery.

The dual-pump arrangement is set to deliver a constant volume at all times, by varying the composition of the mixture between A and B, however without changing the total volume being delivered. By incorporating valves into the supply line from the reservoir to the pumps, it is possible to change to other solutions that might be required to produce more complex gradients. These valves then could be triggered by microswitches which are actuated as a function of the drum position, i.e. the time axis.

Considering the form shown in the drawings, the invention comprises a pump assembly 1 and a curve and curve follower assembly 2 which are interconnected by means of the servo drive assembly 3.

The pump assembly 1 comprises pump motor 10 suitably electrically energized and connected through mechanical drive 11, which can be a direct coupled shaft or a suitable gear reducer of any conventional sort, to pump A. A suitable mechanical coupling 12 is connected between pump A and pump B so that both pumps rotate at the same speed. Fluid A flows through inlet 13 to pump A from a suitable source of supply and fluid B flows through inlet 14 to pump B from a suitable source of supply. Pump A discharges through flow line 16 through constant back pressure device 17 into a T connection 18 through discharge line 20.

Fluid B from pump B discharges through line 21 through constant back pressure device 22 into T at 18 and through discharge line 20. Suitable mixing takes place in the T of 18 to provide a proper mixture of fluids A and B through line 20. Line 20 is connected to the point of usage of the fluid.

Pump A and pump B are of any well known variable delivery type wherein the volume can be made to vary with a given constant speed, for instance, by varying the length of stroke. This can be done by stroke adjustment screws 23 and 25 which are adapted to be rotated whereby the length of the pump stroke is adjusted. The stroke adjustment screws 23 and 25 have keyed thereon respectively spur gears 26 and 27. Spur gear 26 is in engagement with idler gear 29 which, along with spur gear 27 is in meshing arrangement with spur gear 28 keyed on shaft 30 of control motor 31. Since volume delivery is a linear function of stroke length, it also will be a linear function of rotation of stroke adjustment screws 23 and 25.

Figure 2:
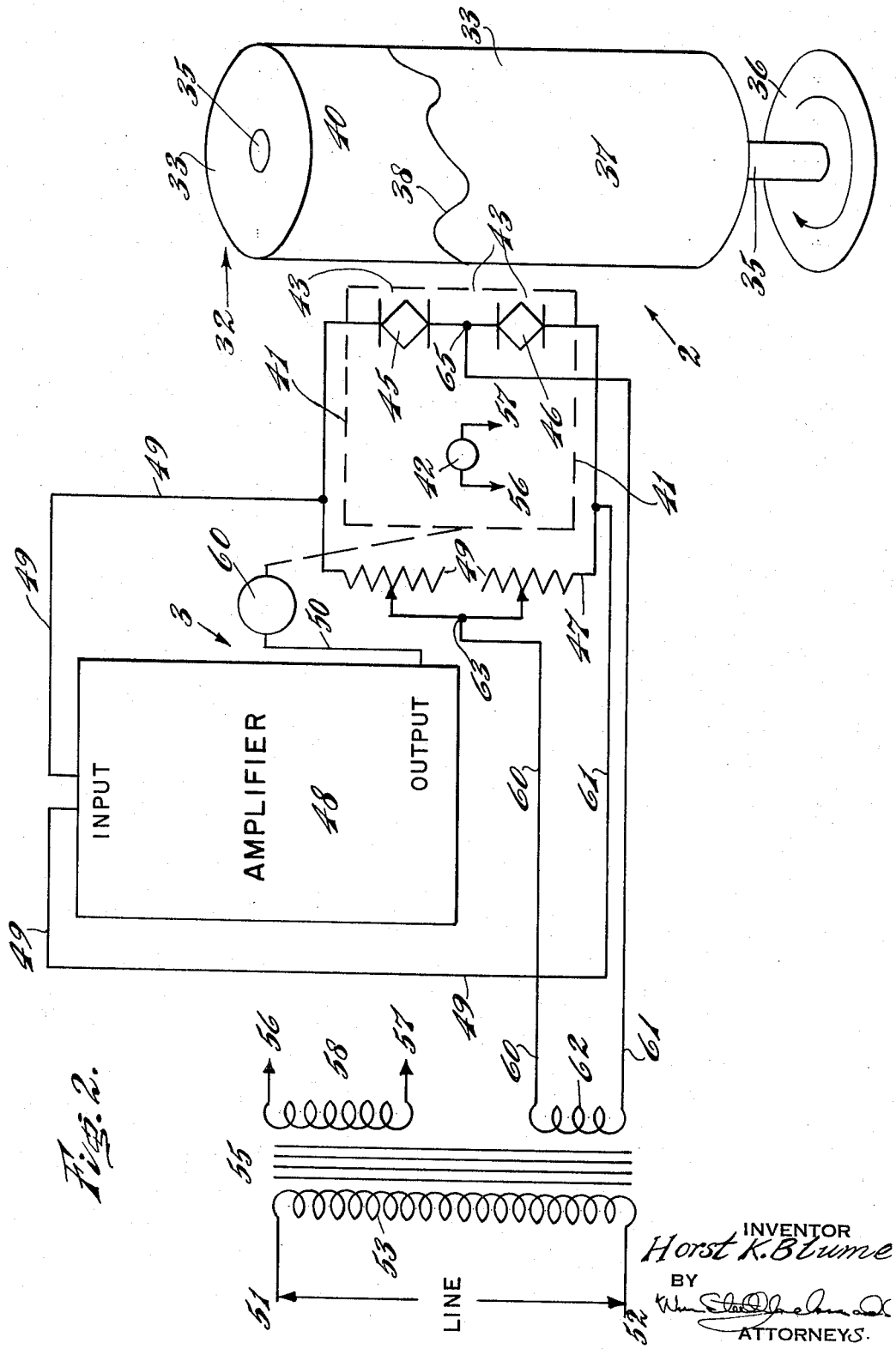
FIGURE 2 is a schematic layout of the invention including a showing of the electrical arrangement.

The curve and curve follower assembly 2 comprises a drum arrangement 32 as shown in FIGURE 1 which is preferably a mono-drum arrangement as shown but permissibly a dual-drum arrangement, possibly with adjustable drum spacing to allow the use of various lengths of curves. The drum 33 of the mono-drum or one drum of the dual-drum arrangement is driven through shaft 35 by a synchronous motor 36 which can be adjusted for various drive speeds. The drum has wrapped thereon a pre-cut paper curve 37 as shown in FIGURE 2, suitably of a white paper having a dull finish, which has cut therein the curve 38 which represents the loci of a plurality of coordinate point positions representing X and Y coordinates wherein the X direction circumferentially of the drum 33 represents a time variable and the Y distance longitudinally of the drum surface represents the particular component variable. The pre-cut curve 37 is fastened on a suitable black paper 40 having preferably a glossy surface and then this paper is wrapped around the drum 33 and suitably fastened. The pre-cut curve 37 will represent a sufficient difference in direct reflection so that when the light falls upon the black paper 40 almost all the light will be reflected directly and fall upon the photocells as later described.

A photoelectric detector head 41 (FIGURE 1) is mounted at the periphery of the drive drum 33 slidably along an axis 39 parallel to the drum shaft 35 in a manner which allows longitudinal movement of the detector head 41 along the axis 39. Axis 39 can be suitably a rod system wherein the detector head 41 is driven selectively along the rod in a Y direction parallel to the drum 33 as the drum 33 rotates (FIGURE 2). The detector head 41 is selectively driven to follow the curve 38 in the Y direction by a suitable mechanical drive 44 connected to control motor 31 (FIGURE 1).

The detector head 41 contains a light source 42, a lens system 43 and two photocells 45 and 46 (FIGURE 2). The light source 42 projects a beam of light at an incident angle of 45 degrees to the normal on the drum, around which the pre-cut white paper curve 37 is wrapped. One photocell 45 is mounted as to receive the regular reflected light at an angle of 45 degrees on the opposite side of the normal while the second cell 46 is mounted at zero degrees or in the axis of the normal to receive diffuse reflected light only. By fastening the pre-cut curve 37 on the black paper 40 and then wrapping this black paper 40 around the drum 33 or drums, the pre-cut curve 37 will represent a sufficient difference in reflection so that when the light falls upon the black paper 40 almost all the light will be reflected directly and fall upon the 45 degree photocell 45 and almost no light will fall upon the zero degree photocell 46. However, with the light falling upon the white paper curve 37, the direct reflection will be reduced to a very low level while the diffuse reflection will be increased to a rather high level. Thus, in one case the photocell 45 at 45 degrees will receive light when the light falls upon the glossy surface of the black paper 40 while the photocell 46 at zero degrees will receive light when the light falls upon the light material from which the curve 37 is cut. When the detector head 41 is located at the borderline, the position can be reached where both photocells 45 and 46 receive the same amount of light from the light source 42.

By connecting the photocells 45 and 46 into an AC bridge circuit 47, the two photocells can be utilized for directional drive of the control motor 31 of the servo drive assembly 3. Bridge circuit 47 includes a variable impedance 49 for adjustment of the appropriate balance position. The bridge circuit 47 is connected to amplifier 48 by means of electrical leads 49. The control motor 31 is bi-directional and is suitably connected to amplifier 48 by electrical leads 50.

In an alternate embodiment as seen in FIGURE 3, the photoelectric detector head 41 contains a single photocell 46' which is mounted to receive the diffuse reflected light at angle of 45 degrees from the light source 42. The light source is projecting a beam of light at an incident angle of, for instance, 45 degrees to the axis of the drum 33. The photocell 46 will receive a large amount of light when the light falls upon the white paper 37, while the photocell 46' will receive practically no light when the light falls upon the black carrier paper 40. When being located at the borderline 38, a position can be reached where the photocell 46' receives just enough light to reach a balance position. The photocell 46' is connected into the bridge circuit 47.

The entire system is electrically energized from a suitable line supply 51 and 52 (FIGURE 2), for instance 110 v. 60 cycle current, which feeds the primary winding 53 of step-down transformer 55. Leads 56 and 57 of secondary winding 58 are connected to light source 42 in photoelectric detector head 41. Leads 60 and 61 from secondary winding 62 of step-down transformer 55 are connected to bridge circuit 47 at 63 and 65.

In operation, the control motor 31 drives the detector head 41 which follows the borderline 38 of the cut curve 37 as a function of the error signal received from the photocell bridge circuit 47. Additionally, the same control motor 31 (FIGURE 1) also drives the stroke adjustment screws 26 and 27 of the dual-pump arrangement accordingly. Thus, the position of the detector head 41 (FIGURE 2) which follows the curve 38 and physically moves with it in the Y direction determines the stroke adjustment 26 and 27 of the pumps A and B (FIGURE 1) which in turn produces the gradient of the outlet flow at 20 as a function of the combined volume delivery.

By coupling the control motor 31 mechanically with the adjustment screws 23 and 25 of the two pumps A and B by means of shaft 30, spur gears 26 and 27, and idler gear 29, the volume delivery at 20 of each of the two pumps A and B will be a function of the position of the photoelectric detector head 41, that is, a function of the cut curve at 37 since it follows this curve in the Y direction as the drum rotates in the X direction. Thus, by changing the proportion of the materials A and B being pumped by means of changing the volume delivery of each pump A and B with the stroke adjustment screws 23 and 25, the resulting mixture delivered by the two pumps at 20 will be a function of the curve 38 followed by the detector head 41.

The stroke adjustment screws of both pumps A and B are coupled in oppositional drive direction by means of spur gears 26 and 27 having a ratio of 1:1 and idler gear 29, and since both pump stroke adjustments 23 and 25 are linear functions of rotation, they can be set to deliver a constant volume at all times. By initially setting pump A at a stroke of zero percent and pump B at 100 percent, it is possible to change the composition of the pumped materials from A to B or reversed over all kinds of mixtures in both directions without changing the total volume delivered. The constant back pressure devices 17 and 22 on the discharge lines 16 and 21 of both pumps assures even mixing in the T connection 18 to discharge the flow through output line 20.

The above described system can also be used in connection with valves or other flow regulating devices, instead of the two pumps, to produce a gradient.

It is also possible to utilize a mechanical curve follower instead of the photoelectric curve follower and to use such a mechanical curve follower to regulate pumps or valves or other devices.

This described system can also be used to transfer complex functions into other complex functions. For example, a pre-cut curve presented on a linear coordinate system can be converted into a logarithmic hyperbolic function by means of a slide wire having such a characteristic. This slide wire is connected into the drive of the photoelectric detector head 41 and a constant millivolt or voltage signal supplied to it. By having the detector head 41 follow the cut curve which may be on a linear basis, the logarithmic potentiometer slide wire actuated by the same drive would convert this linear movement into a logarithmic output signal of any desired voltage level. Thus, the curve follower itself can be used as a function transfer device to convert the complex graphical functions into any desired signals.

In view of my invention and disclosure, variations and modifications to meet individual whim or particular need will doubtless become evident to others skilled in the art, to obtain all or part of the benefits of my invention without copying the structure and method shown, and I, therefore, claim all such insofar as they fall within the reasonable spirit and scope of my claims.

Having thus described my invention what I claim as new and desire to secure by Letters Patent is:

1. In a gradient producing device, a pump assembly having a constant given output, a curve and curve follower assembly, a servo system drive assembly connected to the pump and curve and curve follower assemblies, the pump assembly comprising a pair of variable volume pumps, a drive for the pumps, adjustments for varying the capacity of each of the pumps so that the pump assembly output is constant, and means for moving the adjustments, the curve and curve follower assembly comprising a cylindrical drum having a longitudinal axis, a drive for the drum to rotate the drum on its axis, the surface of the drum being divided into two portions to form a curve between the portions, the surface of the first portion having a first light reflectivity and the surface of the second portion having a second light reflectivity different from the reflectivity of the first portion, means for rotating the drum on its longitudinal axis, a photoelectric detector head slidably mounted on a second axis extending parallel to said drum axis, a detector head drive for moving the detector head longitudinally on the second axis, the photoelectric detector head including a light source for imparting light to the surface of the drum and two photoelectric cells within the detector head for intercepting the reflected light from the drum, one of the photoelectric cells being positioned to intercept light from the first of the portions on the drum surface and the second of the photoelectric cells being positioned to intercept light from the second of the portions, and electrical means for transmitting from the detector head a signal indicating the light reflected to each of the photoelectric cells, and said servo system drive assembly comprising a bridge circuit and amplifier for receiving the signal from the detector head and amplifying and transmitting the signal, a motor for receiving the signal and moving the pump adjustment means and detector head drive responsive to said signal whereby the detector is positioned continually along the curve on the drum while the drum rotates and the pumps are adjusted to produce a gradient corresponding to the curve on the drum.

2. In a gradient producing device, a pump assembly having a constant given output, a curve and curve follower assembly, a servo system drive assembly connected to the pump and curve and curve follower assemblies, the pump assembly comprising a pair of variable volume pumps, a drive for the pumps, adjustments for varying the capacity of the pumps to provide the constant given output of the pump assembly, and means for moving the adjustments, the curve and curve follower assembly comprising a cylindrical drum having a longitudinal axis, a drive for the drum to rotate the drum on its axis, the surface of the drum being divided into two portions to form a curve between the portions, the surface of the first portion having a first light reflectivity and the surface of the second portion having a second light reflectivity different from the reflectivity of the first portion, means for rotating the drum on its longitudinal axis, a photoelectric detector head slidably mounted on a second axis extending parallel to said drum axis, a detector head drive for moving the detector head longitudinally on the second axis, the photoelectric detector head including a light source for imparting light to the surface of the drum and a photoelectric cell within the detector head for intercepting the reflected light from the drum, and electrical means for transmitting from the detector head a signal indicating the light reflected to the photoelectric cell, and said servo system drive assembly comprising a bridge circuit and amplifier for receiving the signal from the detector head and amplifying and transmitting the signal, a motor for receiving the signal and moving the pump adjustment means and detector head drive responsive to said signal whereby the detector is positioned continually along the curve on the drum while the drum rotates and the pumps are adjusted to produce a gradient corresponding to the curve on the drum.

References Cited by the Examiner

UNITED STATES PATENTS

| | | | |
|---|---|---|---|
| 2,262,354 | 11/1941 | Cates | 250—202 X |
| 2,910,943 | 11/1959 | Marshall et al. | 103—11 |
| 2,988,682 | 6/1961 | Wilhelm | 250—202 X |
| 3,164,005 | 1/1965 | Burnell et al. | 250—202 X |

RALPH G. NILSON, *Primary Examiner.*

J. D. WALL, *Assistant Examiner.*